US009977048B2

(12) United States Patent
Schmid et al.

(10) Patent No.: US 9,977,048 B2
(45) Date of Patent: May 22, 2018

(54) METHOD AND DEVICE FOR EXAMINING SIGNALS

(71) Applicant: Robert Bosch GmbH, Stuttgart (DE)

(72) Inventors: Michael Schmid, Kornwestheim (DE); Mariusz Koc, Stuttgart (DE); Nikolaos Gortsas, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 15/213,478

(22) Filed: Jul. 19, 2016

(65) Prior Publication Data
US 2017/0023609 A1    Jan. 26, 2017

(30) Foreign Application Priority Data
Jul. 20, 2015 (DE) .................. 10 2015 213 599

(51) Int. Cl.
| *G01P 21/00* | (2006.01) |
| *G01C 25/00* | (2006.01) |
| *G01P 15/12* | (2006.01) |
| *G01P 15/125* | (2006.01) |
| *G01P 15/09* | (2006.01) |
| *G01P 15/18* | (2013.01) |

(52) U.S. Cl.
CPC .............. *G01P 21/00* (2013.01); *G01C 25/00* (2013.01); *G01P 15/0922* (2013.01); *G01P 15/123* (2013.01); *G01P 15/125* (2013.01); *G01P 15/18* (2013.01)

(58) Field of Classification Search
CPC ........................................................ G01P 21/00
USPC .......................................................... 73/1.38
See application file for complete search history.

(56) References Cited

U.S. PATENT DOCUMENTS

| 8,797,047 | B2* | 8/2014 | Jiang ...................... G01D 18/00 324/613 |
| 9,737,265 | B2* | 8/2017 | Zheng .................. A61B 5/7203 |
| 2008/0292032 | A1* | 11/2008 | Belogolovy ........ H04L 27/2614 375/346 |
| 2012/0059620 | A1* | 3/2012 | Lee .......................... G01H 1/00 702/141 |
| 2014/0269850 | A1* | 9/2014 | Abdelmonem ....... H04L 5/0026 375/148 |
| 2017/0023609 | A1* | 1/2017 | Schmid .................. G01C 25/00 |
| 2017/0302332 | A1* | 10/2017 | Abdelmonem ...... H04B 1/1036 |

* cited by examiner

*Primary Examiner* — Clayton E Laballe
*Assistant Examiner* — Kevin Butler
(74) *Attorney, Agent, or Firm* — Michael Best & Friedrich LLP

(57) ABSTRACT

A method for examining signals. The method comprises a step of reading in a signal (204), a step of comparing the signal (204) to an interference signal characteristic characterizing an interference signal in order to determine whether the signal (204) represents the interference signal, and a step of buffering the signal (204) at least for a predetermined time interval in order to obtain a buffered signal (222).

14 Claims, 2 Drawing Sheets

METHOD AND DEVICE FOR EXAMINING SIGNALS

BACKGROUND OF THE INVENTION

The invention relates to a method and a device. The subject matter of the present invention is also a computer program.

A multiplicity of inertial sensors is distributed throughout modern vehicles. Due to an increasing number of linkages between sensors and in order to prevent a double installation of the sensors, said sensors are often integrated into one or a few control devices which then provide the sensor information to applications within this control unit or outside of the same. Sensors can have vulnerabilities which can lead to signal interference in special usage situations.

SUMMARY OF THE INVENTION

In view of the above technical field, the approach according to the invention relates to a method for examining signals and furthermore to a device which uses this method as well as finally to a corresponding computer program.

A comparison of a read signal to an interference signal characteristic characterizing an interference signal makes it possible to determine whether the read signal relates to an interference signal.

According to the approach proposed here, signal interferences of a sensor can be recognized and can be corrected in a modification to the proposed concept before the interference signals are sent to an application within or outside of the control device carrying out the comparison. This is made possible by virtue of the fact that, due to the active principle, the interferences have a pattern that is represented in the interference signal characteristics and can be reproduced; thus enabling the interferences to be distinguished from possible useful signals after considering the further signal profile.

In a modification to the proposed approach, the sensor signals can thus be retroactively corrected in an advantageous manner after the further signal profile has been taken into consideration. This can be done without the useful signals being distorted.

According to the concept proposed here, malfunctions of signal pick-up applications can be avoided without having to design or apply the algorithms of the pick-up functions so robustly that no malfunctions occur. As a result, a higher degree of efficiency of the relevant function can be achieved.

An angular rate sensor is only given as an example of a sensor which is also known as a yaw rate sensor, roll rate sensor or pitch rate sensor depending on the sensing axis. Due to their measuring principle, angular rate sensors are only subject to interference as active oscillators during an input of linear accelerations and/or rotational movements in one or a plurality of special narrowband frequency ranges. If the sensor experiences such an external interference, the sensor then shows distorted signals for a short period of time.

Signal pick-ups for these angular rate signals are, e.g. for the roll rate, the rollover sensing—short RoSe—a rollover prevention logic or a damping control system. For the pitch rate, this would be the headlight range control or a damping control system. In addition to the electronic stability program (ESP), a plurality of other pick-ups is conceivable for determining the yaw rate.

The invention relates to a method for examining signals, wherein the method comprises the following steps:

reading in a signal;
comparing the signal to an interference signal characteristic that characterizes an interference signal in order to determine whether the signal represents the interference signal; and
buffering the signal at least for a predefined interval of time in order to obtain a buffered signal.

In the comparing step, the signal can be compared to at least one beginning partial characteristic and one end partial characteristic of the interference signal characteristic characterizing the interference signal in order to determine whether the signal represents the interference signal. In this case, a length of the time interval can be determined by means of a time lag between the beginning partial characteristic and the end partial characteristic.

The signal can relate to an electronically transmitted pulse of a sensor, for example an angular rate sensor or acceleration sensor of a vehicle. The interference signal can relate to a faulty measurement of the sensor providing the signal, which resembles a useful signal. The interference signal characteristic characterizing the interference signal can describe a defined signal profile over the predetermined time interval. In so doing, the beginning partial characteristic can represent a beginning section of the signal profile, and the end partial characteristic can represent an end section of the signal profile.

According to one embodiment of the method, in the step of comparing, the beginning partial characteristic of the interference signal characteristic can represent a first signal edge and the end partial characteristic of the interference signal characteristic can represent a second signal edge oriented oppositely to the first signal edge. The first signal edge can relate to a rising signal edge, and the second signal edge to a falling signal edge or vice versa. By means of the signal edges, the interference signal can thus be easily identified by detecting that a threshold value has been exceeded.

The method can furthermore carry out a step of providing the buffered signal to an application interface if in the step of comparing it is determined that the signal does not represent the interference signal. Malfunctions of signal processing devices connected to the application interface can thus be advantageously prevented.

According to one embodiment, the method can carry out a step of modifying the buffered signal in order to obtain a modified signal if it is determined in the step of comparing that the signal represents the interference signal. The signal can then be easily corrected.

The method can subsequently carry out a step of providing the modified signal to an application interface. By means of this embodiment of the invention, it can be ensured that signal processing devices connected to the application interface work with an interference-free signal.

In the step of modifying the buffered signal, an interpolation can, for example, be carried out between a first interference-free section of the signal, which lies before a section of the signal representing the interference signal, and a second interference-free section of the signal, which lies after the section of the signal representing the interference signal. In an advantageous manner, the interference signal can thus be quickly and robustly removed.

According to one particular embodiment, the method can carry out a step of providing interference signal suspicion information to an application interface if it is determined in the step of comparing that the signal corresponds to the beginning partial characteristic of the interference signal characteristic. The step of providing the interference suspicion information can particularly be carried out before the time interval has elapsed. In so doing, it can be ensured that a signal delay and therefore a delay in a signal processing device connected to the application interface occurs only for a fractional part of events detected by the associated sensor.

The method can further carry out a step of suppressing a program response based on the signal or the buffered signal in response to the step of providing the interference signal suspicion information. This embodiment makes it possible to ensure that a signal processing device associated with the program response does not carry out any steps based on an interference signal.

It is advantageous if the method carries out a step of confirming the suppression of the program response based on the signal if it is determined in the step of comparing that the signal corresponds to the end partial characteristic of the interference signal characteristic. This embodiment makes it possible to easily ensure that the program response based on the signal is definitively discarded.

Alternatively, the method can carry out a step for introducing the program response if it is determined in the step of comparing that the signal does not correspond to the end partial characteristic of the interference signal characteristic. Thus, the previously suppressed program response can now be carried out with only a slight delay.

This method can, for example, be implemented in software or hardware or in a mixed form consisting of software and hardware, for example, in a control device.

The approach presented here relates furthermore to a device designed to carry out, actuate or respectively implement the steps of a variant of the method for examining signals presented here in corresponding means. The aim underlying the invention can also be quickly and efficiently met by means of this embodiment variant of the invention in the form of a device.

In the present variant of the invention, a device can be understood as an electric device which processes sensor signals and emits control and/or data signals as a function thereof. The device can have an interface which is designed by means of hardware and/or software. In a design by means of hardware, the interfaces can, for example, be part of a so-called system-ASIC, which includes various functions of the device. It is, however, also possible that the interfaces are inherent, integrated switching circuits or consist at least partially of discrete components. In a design by means of software, the interfaces can be software modules, which are, for example, present on a microcontroller in addition to other software modules.

A computer program product or a computer program having a program code is advantageous, which can be stored on a machine-readable carrier or storage medium, such as a semiconductor memory, a hard drive memory or an optical memory, and is used to carry out, implement and/or actuate the steps of the method according to one of the embodiments described above, in particular if the program product or the program is executed on a computer or a suitable device.

BRIEF DESCRIPTION OF THE DRAWINGS

Exemplary embodiments of the invention are depicted in the drawings and are explained in detail in the following description. In the drawings.

in the following description of advantageous exemplary embodiments of the present invention, the same or similar reference signs are used for the elements which are depicted in the various figures of the drawings and have a similar effect, whereby the need for a repeated description of these elements is eliminated.

DETAILED DESCRIPTION

Figure 1:
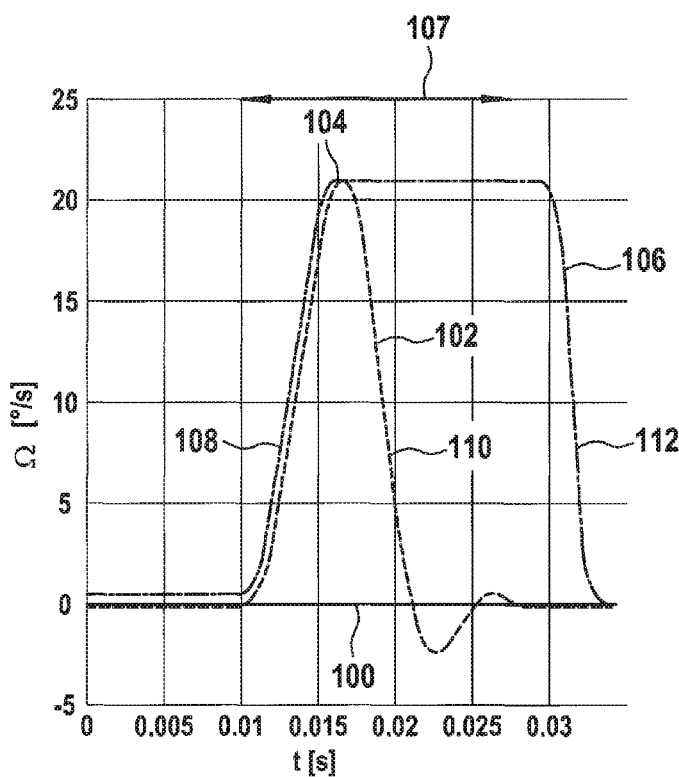
FIG. 1 shows a diagram for depicting a useful signal and an interference signal pursuant to exemplary embodiments.

FIG. 1 shows a diagram designed to depict exemplary signals of sensors. A Cartesian coordinate system is shown. The time t[s] is plotted at intervals of milliseconds along the abscissa. The angular rate or angular speed $\Omega$ [°/s] is plotted along the ordinate, which generally is also denoted by the symbol $\omega$. The diagram in FIG. 1 shows three graphs for illustrating typical signal profiles of various signal forms. In so doing, the signal is only selected by way of example. For example, voltage values, current values, resistance values or other variables could alternatively be plotted along the ordinate.

A first graph 100 extends in a straight line across the time t at an angular rate of 0. The first graph 100 denotes a signal profile 100 that is typical for a signal detected by the associated sensor if a relevant event does not take place.

A graph 102 shown as a dashed line in the depiction in FIG. 1 illustrates an exemplary interference signal characteristic 102 of an interference signal from the associated sensor. The interference signal characteristic 102 initially runs parallel to the signal profile 100 at an angular rate of 0 and starts at a point in time shortly after the 0.01 second mark in the form of a Gaussian curve in order to level off parallel to the signal profile 110 again at an angular rate of 0 after a short deflection into the negative angular rate range between approximately 0.021 and 0.026 seconds. A peak 104 or respectively a peak 104 of the signal profile 102 represents a maximum angular rate value of approximately 21.

A graph 106 shown in the depiction of FIG. 1 as a dot-dashed line represents a useful signal of the associated sensor. The useful signal 106 initially runs parallel to the signal profile 100, rises then parallel to the interference signal characteristic 102 up to the maximum angular rate value 104. The useful signal remains at this high level beyond a time interval 107 that is indicated in FIG. 1 by means of a double arrow. The signal profile 106 likewise subsequently falls to the value of 0. By way of example, the time interval 107 depicts here a period of time between 0.01 seconds and 0.027 seconds from the point in time of signal detection.

The signal profiles 100, 102, 106 each have a beginning partial characteristic and an end partial characteristic, the beginning partial characteristic representing a beginning section and the end partial characteristic an end section of the graphs 100, 102, 106 plotted in the diagram. A beginning partial characteristic of the interference signal 102 and a beginning partial characteristic of the useful signal 106 form a common rising signal edge 108. The rising signal edge 108 is immediately followed by an end partial characteristic 110 of the interference signal 102 representing a falling signal edge 100. An end partial characteristic 112 of the useful signal 106 representing a falling signal edge 112 occurs at a later point in time t in comparison to the falling signal edge 110 of the interference signal 102.

The signal profiles 100, 102, 106 shown in FIG. 1 are merely examples and are supposed to particularly illustrate the difference between the interference signal 102 and the useful signal 106. The profile of the interference signal 102 comprising the rising edge 109 and the falling edge 110 immediately thereafter denote a faulty measurement of the associated sensor, for example in the form of an input of a linear acceleration and/or a rotational movement in one or a plurality of special narrowband frequency ranges of the associated sensor—if the associated sensor relates to an acceleration or angular rate sensor.

According to one exemplary embodiment, the rising signal edge 108 indicates that a threshold value, which is not shown in FIG. 1, has been exceeded. The presence of the interference signal 102 is indicated by the threshold value having been exceeded.

The profile of the interference signal 102, which is depicted in FIG. 1 and is in the form of a Gaussian curve, is, for example, typical for an interference of an angular rate sensor due to linear accelerations in sensor specific critical frequency ranges of the angular rate sensor, wherein the edge steepness of the edges 108, 110 is determined by an internal filter characteristic of the sensor.

An interference of the sensor cannot, however, be detected or only be detected to a limited extent in the rising edge 108 because said rising edge can be identical to that of the useful signal 106, as is shown by way of example in FIG. 1. Nevertheless, the falling edge 110 shortly thereafter is typical for an interference, whereas the useful signal 106 remains longer—in this case beyond the time interval 107—at a high signal level. After the interference on the falling edge has been detected, the signal in the signal memory, in accordance with the concept of examining signals proposed here, is corrected before being provided to applications, e.g. by interpolation of the signals around the signal peak 104 before and after the interference. This will be discussed in greater detail with the aid of the succeeding figures.

Figure 2:
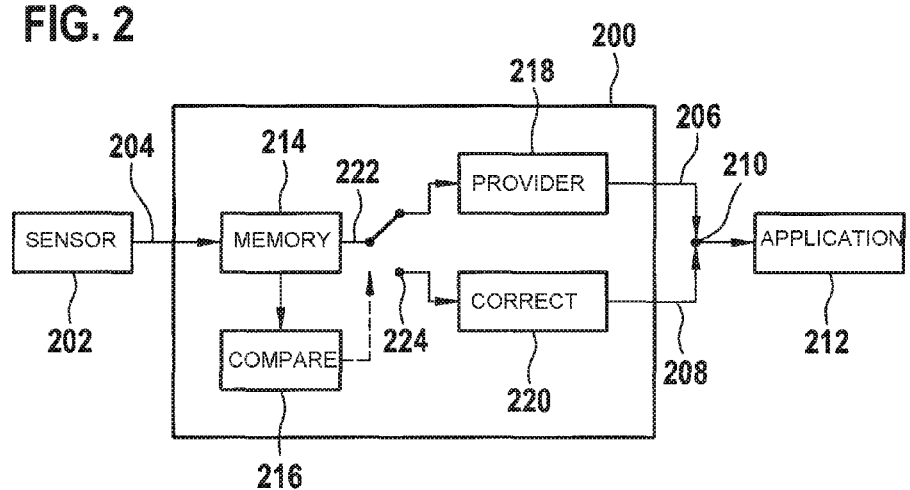
FIG. 2 shows a block wiring diagram of a device for examining signals pursuant to one exemplary embodiment.

FIG. 2 shows a block wiring diagram of a device 200 for examining signals according to one exemplary embodiment of the concept proposed here. The device 200 can relate to a control device of a road vehicle, such as, e.g., a passenger vehicle or a truck.

A signal 204 is read by a sensor 202 into the device 200. The sensor 202 relates according to exemplary embodiments to an acceleration sensor or an angular rate sensor of an inertial sensor installed in the road vehicle. The device 200 processes the signal 204 and provides a further signal 206 or an alternative further signal 208 to an application interface 210 comprising an application 212 associated with the inertial sensor.

The application 212 can relate to a signal processing device of the vehicle, for example for a rollover sensing. The application 212 can be part of the control device comprising the device 200 or be situated outside of the control device comprising the device 200 and, for example, be part of an additional control device of the vehicle coupled to the control device comprising the device 200.

The device 200 for examining signals shown by way of example in FIG. 2 comprises a signal memory 214, a comparing means 216, a signal providing means 218 as well as a signal correcting means 220.

The signal memory 214 is designed to buffer the signal 204 for a predetermined time interval in order to obtain a buffered signal 222 and to provide said signal to an interface 224 comprising the signal providing means 218 and the signal correcting means 220.

The comparing means 216 is designed to compare the signal 204 to a beginning partial characteristic and to an end partial characteristic of an interference signal characteristic characterizing an interference signal as is shown by way of example in FIG. 1. The comparing means thus determines whether the signal 204 represents the interference signal or a useful signal.

According to one exemplary embodiment, the comparing means 216 is designed to identify the signal as an interference signal by detecting the maximum angular rate value or respectively peak of the signal curve, which is shown by way of example in FIG. 1, for example by means of a threshold value comparison.

A length of the time interval for buffering the signal 204 in the signal memory 214 is determined by a time lag between the beginning partial characteristic and the end partial characteristic of the interference signal characteristic. According to one exemplary embodiment, the beginning partial characteristic of the interference signal characteristic represents a rising signal edge as depicted by way of example in FIG. 1, and the end partial characteristic of the interference signal characteristic represents a falling signal edge.

If the comparing means 216 does not identify the signal 204 as an interference signal but respectively as a useful signal, the buffered signal 222 is provided to the signal providing means 218 via the interface 224. The signal providing means 218 is designed to transmit the buffered signal 222 as the additional signal 206 in the original or unmodified form to the application 212 via the application interface 210.

If, on the other hand, the comparing means 216 identifies the signal 204 as an interference signal, the buffered signal 222 is provided to the signal correcting means 220 via the interface 224. The signal correcting means 220 is designed to modify, for example to correct, the buffered signal 222 and to provide a modified signal 208 as the alternative additional signal 208 to the application 212 via the application interface 210.

According to one exemplary embodiment of the device 200, the signal correcting means 220 carries out an interpolation, in which a first interference-free section of the signal 222 that lies before the section of the signal 222 representing the interference signal is interpolated with a second interference-free section of the signal 222 lying after the section of the signal 222 representing the interference signal.

The device 200 has the task of filtering interferences out of the signal 204 using a (non-linear) filter. The (non-linear) filter used in this case is based on detecting the signal profile significant for the interference. It is relevant in this process that the signal 204 is buffered so that not only the current sensor value for an interference correction can be changed but that the detection of the interference can also occur retroactively.

The detection methods used in the device 200 are dependent on the respective interference characteristic. For example, an interference of an angular rate sensor resembles a Gaussian curve due to linear accelerations in sensor specific critical frequency regions, such as said interference is shown by way of example in FIG. 1. The steepness of the edge of the interference characteristic is thereby determined by the internal filter characteristic of the sensor 202.

After the interference on the falling edge was detected, the signal 222 in the signal memory 214 is corrected in the signal correcting means 220, e.g. by interpolation of the signals before and after the interference around the interference peak, prior to being further transmitted to the application 212, as it is shown by way of example in FIG. 2. The signal correction carried out in the signal correcting means 220 can also be referred to as "signal washing" of the distorted signal.

Figure 3:
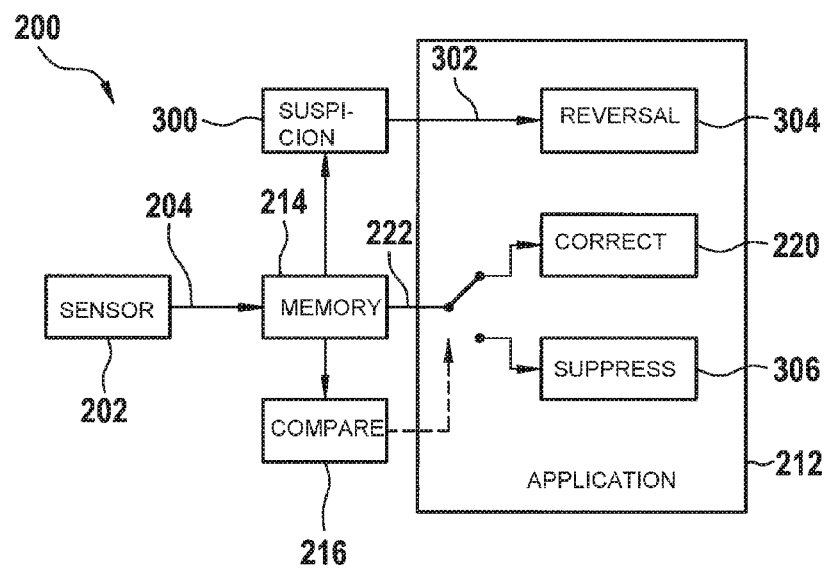
FIG. 3 shows a block wiring diagram of a device for examining signals pursuant to a further exemplary embodiment.

FIG. 3 shows a block wiring diagram of another exemplary embodiment of the device 200 for examining signals. In this case, the device 200 is expanded by means 300 for providing interference signal suspicion information 302 to the application 212. The interference signal suspicion information 302 contains data about the presence of a suspicion that the signal 204 relates to an interference signal.

The means 300 is designed to provide the interference suspicion information 302 to means 304 for a response suppression of the application 212 if the comparing means 216 determines that the signal 204 corresponds to the beginning partial characteristic of the interference signal characteristic. The application 212 is designed to carry out a program response if the signal 204 relates to a useful signal.

The advantage of the embodiment of the device 200 shown in FIG. 3 is that the interference signal suspicion information 302 has already been transmitted to the means 304 for a response suppression of the application 212 before the time interval has elapsed in which the comparing means 216 carries out the signal comparison. In so doing, the application 212 is in the position to suppress or delay a program response based on the signal in response to the provision of the interference signal suspicion information 302 until the suspicion of a signal interference is confirmed or not.

If the comparing means 216 now determines with the elapsing of the time interval that the signal 204 also corresponds to the end partial characteristic of the interference signal characteristic, the suspicion is confirmed that the signal 204 relates to an interference signal and not to a useful signal. The suppression of the program response based on the signal 204 is subsequently confirmed and the application 212 does not carry out the program response.

This takes place according to the exemplary embodiment shown in FIG. 3 by the application 212 retroactively carrying out a signal correction in an internal signal correcting means 220 in response to the provision of the buffered signal 222.

If, on the other hand, the comparing means 216 determines with the elapsing of the time interval that the signal 204 does not correspond to the end characteristic of the interference signal characteristic and that the signal 204 relates accordingly to a useful signal, the application 212, in response to the provision of the buffered signal 222, carries out an active reversal of the response prevention performed in the means 304 or respectively a retroactive introduction of the previously suppressed program response in a suitable means 306 of the application 212.

The variant of the concept for examining signals proposed here, which is depicted in FIG. 3, is particularly suitable for applications 212 within the control device, in which the sensor signal 204 is initially processed. This is due to the fact that the additional information 302 is delivered instead of a time-delayed signal, said additional information indicating a suspicion of the signal interference. As a result, critical application responses are prevented from being carried out during the signal 204. After the further progression of the signal has been examined, the signal error, in the case of a detected interference, is calculated from the variables derived from the signal 204 in the application 212 and/or the suppression of the application response is confirmed. In the case of an erroneous interference suspicion, the application response is retroactively introduced.

This is advantageous in comparison to the variant of the signal examination or respectively the signal washing presented in FIG. 2 because a signal delay and therefore also a delay of the application responses only occur at a peak suspicion and thus only for a small fraction of all situations.

Figure 4:
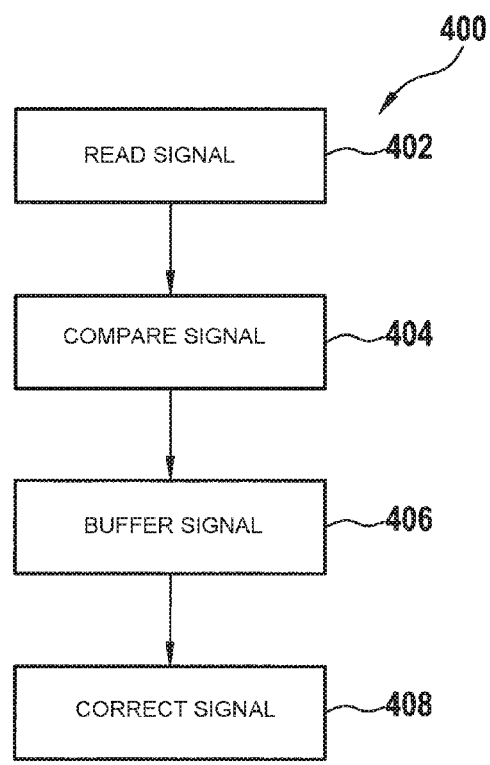
FIG. 4 shows a flow diagram of a method for examining signals pursuant to one exemplary embodiment.

FIG. 4 shows a flow diagram of an exemplary embodiment of a method 400 for examining signals. The method can be carried out in the device 200 shown in FIGS. 2 and 3.

In a step in which the signal is read in 402, a signal is read into the device via an interface. In a step of comparing 404, the signal is compared to a beginning partial characteristic and to an end partial characteristic of an interference signal characteristic that characterizes an interference signal in order to determine whether the signal represents the interference signal. In a step for buffering 406 the signal, said signal is buffered for a predetermined time interval in order to obtain a buffered signal.

According to one exemplary embodiment, the method 400 comprises a step 408 for retroactively correcting a signal interference detected in the step of comparing 404; thus enabling the negative effects of the interference on signal pick-up applications to be prevented.

The signal buffering in step 406 of the method 400 has the effect that the signals are not provided to the applications directly after being developed but are transmitted first with a time offset—which is defined in accordance with the sensor and the application. It is therefore possible to detect a signal interference in the further progression of the sensor signals and subsequently to transmit the signals that were corrected from the effects of the interference with a time offset.

Due to the time offset and the exemplary interpolation of the corrected values, the implementation of the concept presented here in a control device, which provides sensor signals for other pickups, is possible solely by means of the operation of the control device and the consideration of the sensor signals placed on a CAN bus or a FlexRay system. This would, e.g., be the case for all AB-systems, in which the angular rate is provided externally. According to the exemplary embodiments, the proposed concept can also be expanded to RoSe systems.

According to one exemplary embodiment, the device is embodied as a control device, which comprises means for carrying out the steps 402, 404, 406, 408 as well as optionally at least one means for carrying out the application that uses the signal. The control device has a housing that encloses these means.

If an exemplary embodiment comprises an "AND/OR" operation between a first feature and a second feature, this is then to be interpreted that the exemplary embodiment pursuant to one embodiment comprises the first feature as well as the second feature, and the exemplary embodiment pursuant to a further embodiment comprises either only the first feature or only the second feature.

The invention claimed is:

1. A method (400) for examining signals, the method (400) comprising:
   reading (402) a signal (204);
   comparing (404) the signal (204) to an interference signal characteristic (102) characterizing an interference signal in order to determine whether the signal (204) represents the interference signal; and buffering (406) the signal (204) at least for a predetermined time interval 107) in order to obtain a buffered signal (222).

2. The method (400) according to claim 1, in which the interference signal characteristic (102) is constituted by a beginning partial characteristic (108) and an end partial characteristic (110).

3. The method (400) according to claim 2, in which a length of the predetermined time interval is determined by a time lag between the beginning partial characteristic and the end partial characteristic.

4. Method (400) according to claim 3, in which, in the step of comparing (404), the beginning partial characteristic (108) of the interference signal characteristic (102) represents a first signal edge and the end partial characteristic (110) of the interference signal characteristic (102) represents a second signal edge oriented oppositely to the first signal edge.

5. The method (400) according to claim 2, further comprising providing an interference signal suspicion information (302) to an application interface (210) when it is determined in the step of comparing (404) that the signal (204) corresponds to the beginning partial characteristic (108) of the interference signal characteristic (102), the step of providing the interference signal suspicion information (302) being carried out before the predetermined time interval (107) has elapsed.

6. The method (400) according to claim 5, further comprising suppressing a program response based on the signal (204) in response to the step of providing the interference signal suspicion information (302).

7. The method (400) according to claim 6, further comprising confirming the suppression of the program response based on the signal (204) when it is determined in the step of comparing (404) that the signal (204) corresponds to the end partial characteristic (110) of the interference signal characteristic (102).

8. The method (400) according to claim 6 further comprising introducing the program response when it is determined in the step of comparing (404) that the signal (204) does not correspond to the end partial characteristic (110) of the interference signal characteristic (102).

9. The method (400) according to claim 1, comprising a step of providing the buffered signal (222) to an application interface (210) when it is determined in the step of comparing (404) that the signal (204) does not represent the interference signal.

10. The method (400) according to claim 1, comprising a step of modifying (408) the buffered signal (222) in order to obtain a modified signal (208) when it is determined in the step of comparing (404) that the signal (204) represents the interference signal.

11. The method (400) according to claim 10, further comprising providing the modified signal (208) to an application interface (210).

12. The method (400) according to claim 10, in which, in the step of modifying (408), an interpolation is carried out between a first interference-free section of the signal (204) lying before a section of the signal (204) representing the interference signal and a second interference-free section of the signal (204) lying after the section of the signal (204) representing the interference signal.

13. A device (200) which is equipped to carry out the method (400) according to claim 1.

14. A non-transitory machine-readable storage medium on which a computer program is stored which, when executed, carries out the method according to claim 1.

* * * * *